G. R. MOORE.
Culinary-Vessles.
No. 158,598.
Patented Jan. 12, 1875.
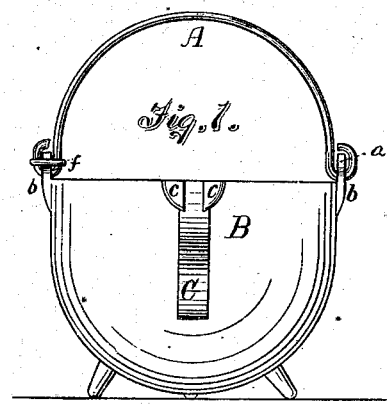
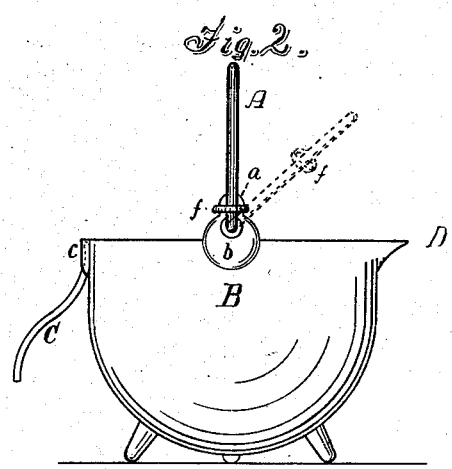
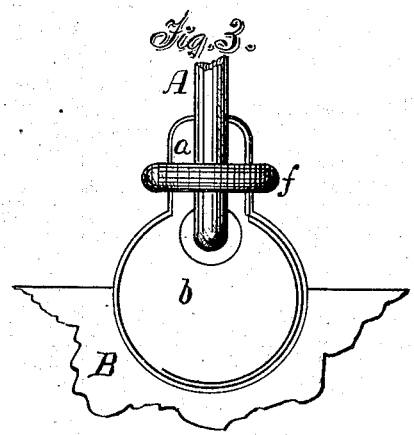
Witnesses.
Inventor.
Geo. R. Moore

UNITED STATES PATENT OFFICE.

GEORGE RODNEY MOORE, OF PHILADELPHIA, PENNSYLVANIA.

IMPROVEMENT IN CULINARY VESSELS.

Specification forming part of Letters Patent No. 158,598, dated January 12, 1875; application filed December 15, 1874.

*To all whom it may concern:*

Be it known that I, GEO. RODNEY MOORE, of the city and county of Philadelphia and State of Pennsylvania, have invented Improvements in Culinary Vessels, of which the following is a specification:

The object of my invention is to provide facilities for handling culinary vessels having hinged bails, when it is desired to pour out from them, and to combine lifting and tipping motions in the said use.

To this end I provide the vessel with duffs, or other means of holding a detachable handle, similar to those used in lifting the removable lids of cook-stoves and ranges. I also place upon the bails of the vessel a small iron ring, to be attached or detached at will with one of the ears in which the said bail is jointed, thus providing means of keeping the bail up and out when the vessel is tipped for pouring out. I also provide a pouring-out flange upon one side of the rim of the vessel.

Figure 1 is a side view of an ordinary cast-iron vessel for cooking purposes with my improvements applied.

A, the bail; B, the vessel; C, the detachable handle; D, the lip; *c c*, the duffs upon the vessel for receiving the detachable handle; *a*, raised prong from the ear *b*, to be embraced, in combination with the bail, by the ring *f*, when it is desired to hold the bail upright or out, to keep the hand of the user as far from the rim of the vessel as possible.

It is obvious that the ring *f*, when raised above the prong *a*, will allow the bail its usual freedom in both directions.

Fig. 2 is a side view, taken at right angles with Fig. 1. Fig. 3 is an enlarged view of the ear *b*, prong *a*, and a portion of the bail A.

I am aware that a rigid handle upon the side of preserving-kettles has been made; but when such handle is placed low enough down to be of use it is in the way of "nesting" the kettles for shipping; and so great is this objection to manufacturers, I am told, that such vessels have never been put upon the market to any extent. It will be seen that I avoid this objection by my detachable handle C; also, in regard to staying the bail so as to keep the hand of the user as far from the rim of the vessel as possible when pouring out. It is but the work of a moment to do this by my device of the ring upon the bail, and prong upon the ear, of the vessel, as already explained.

I claim—

1. The combination of the stopped or stayed bail A and the detachable handle C upon the culinary vessel B, as and for the purpose specified.

2. The combination of a stopped or stayed bail, A, and the pouring-out lip E upon a culinary vessel B, as and for the purpose specified.

3. The prong *a* of the ear *b*, in combination with the bail A and ring *f*, as and for the purpose specified.

GEO. R. MOORE.

Witnesses:
 J. PLANKINTON,
 M. G. AFFLICK.